United States Patent
Aherne et al.

(10) Patent No.: US 8,808,420 B2
(45) Date of Patent: Aug. 19, 2014

(54) PROCESS FOR PREPARING NANOPARTICLES

(75) Inventors: Damian John Aherne, County Dublin (IE); Deirdre Marie Ledwith, County Offaly (IE); John Moffat Kelly, County Dublin (IE)

(73) Assignee: The Provost, Fellows and Scholars of the College of the Holy and Undivided Trinity of Queen Elizabeth, Near Dublin, Dublin (IE)

(*) Notice: Subject to any disclaimer, the term of this patent is extended or adjusted under 35 U.S.C. 154(b) by 769 days.

(21) Appl. No.: 12/735,100

(22) PCT Filed: Dec. 22, 2008

(86) PCT No.: PCT/IE2008/000124
§ 371 (c)(1),
(2), (4) Date: Nov. 23, 2010

(87) PCT Pub. No.: WO2009/081386
PCT Pub. Date: Jul. 2, 2009

(65) Prior Publication Data
US 2011/0064603 A1    Mar. 17, 2011

Related U.S. Application Data

(60) Provisional application No. 61/136,808, filed on Oct. 6, 2008.

(30) Foreign Application Priority Data

Dec. 21, 2007 (IE) .................................. 2007/0931
Oct. 6, 2008 (IE) .................................. 2008/0804

(51) Int. Cl.
*B22F 9/24* (2006.01)
*B82Y 40/00* (2011.01)

(52) U.S. Cl.
CPC . *B22F 9/24* (2013.01); *B82Y 40/00* (2013.01); *B22F 2301/255* (2013.01); *Y10S 977/896* (2013.01)
USPC ............................. 75/371; 75/741; 977/896

(58) Field of Classification Search
None
See application file for complete search history.

(56) References Cited

U.S. PATENT DOCUMENTS 7,033,415 B2 *   4/2006   Mirkin et al. .................... 75/345
7,138,468 B2 *   11/2006  McCormick et al. ............ 526/89
(Continued)

FOREIGN PATENT DOCUMENTS

JP    2007-154292    6/2007
WO   2006/132643    12/2006
(Continued)

OTHER PUBLICATIONS

Lee, G-J et al., "Preparation of Silver Dendritic Nanoparticles Using Sodium Polyacrylate in Aqueous Solution", Chemistry Letters, vol. 33, No. 2, pp. 118-119, published on web Jan. 8, 2004.*

(Continued)

*Primary Examiner* — George Wyszomierski
(74) *Attorney, Agent, or Firm* — Jacobson Holman, PLLC.

(57) ABSTRACT

A process for producing nanoparticles comprises the steps of preparing silver seeds in the presence of a water soluble polyanionic polymer and growing the silver seeds to form nanoparticles. The polyanionic polymer may be poly(sodium styrenesulphonate).

12 Claims, 10 Drawing Sheets

(56) References Cited

U.S. PATENT DOCUMENTS

| | | | |
|---|---|---|---|
| 8,003,166 B2* | 8/2011 | Goh et al. | 427/212 |
| 2003/0136223 A1 | 7/2003 | Jin | |
| 2006/0235087 A1* | 10/2006 | Alexandridis et al. | 516/78 |
| 2010/0098902 A1* | 4/2010 | Kotov et al. | 428/105 |
| 2010/0224026 A1* | 9/2010 | Brennan Fournet et al. | 75/370 |

FOREIGN PATENT DOCUMENTS

| | | |
|---|---|---|
| WO | 2007/149387 | 12/2007 |
| WO | 2008/078970 | 7/2008 |
| WO | 2009/044389 | 4/2009 |
| WO | 2009/056401 | 5/2009 |

OTHER PUBLICATIONS

X. Zou et al., "Surface-Enhanced Raman Scattering Studies on Aggregated Silver Nanoplates in Aqueous Solution," The Journal of Physical Chemistry B, 2006, vol. 110, pp. 21545-21550.

T.C.R. Rocha et al., "Structural Defects and Their Role in the Growth of Ag Triangular Nanoplates," The Journal of Physical Chemistry C, 2007, vol. 111, pp. 6989-6993.

K. Munechika et al., "Plasmon Line Widths of Single Silver Nanoprisms as a Function of Particle Size and Plasmon Peak Position," The Journal of Physical Chemistry C, 2007, vol. 111, pp. 18906-18911.

\* cited by examiner

PROCESS FOR PREPARING NANOPARTICLES

This is a national stage of PCT/IE08/000,124 filed Dec. 22, 2008 and published in English, which has a priority of Irish no. 2007/0931 filed Dec. 21, 2007, and Irish no. 2008/0804 filed Oct. 6, 2008, claiming benefit of U.S. provisional application No. 61/136,808 filed Oct. 6, 2008, hereby incorporated by reference.

INTRODUCTION

This invention relates to a process for preparing nanoparticles. In particular the invention relates to an improved process for preparing silver nanoparticles.

Silver nanoparticles are potentially of great commercial importance. Some examples of the areas in which such particles have potential applications include bioassays, antibacterial coatings, surface enhanced Raman and fluorescence spectroscopy. However, such applications have been retarded by the ability of suitable process for producing monodisperse nanoparticles with a well-defined size.

X. Zou and S. Dong in J. Phys. Chem. B 2006, 110, 21545 describe a method for producing silver nanoparticles in which the size of the silver nanoparticles (nanoplates) can be tuned by controlling the ratio of silver ion:silver seed. Larger nanoplates can be obtained when a large ratio is used.

However in the Zou and Dong process the silver seed solution (prepared by the standard borohydride reduction of $AgNO_3$ in the presence of citrate) has to be aged for at least 24 hours at room temperature before use. The dominant morphologies of the particles produced using the Zou and Dong process include truncated triangles, hexagons and circlelike. Approximately 10% of the particles produced are nanospheres which are polydisperse.

There is therefore a need for an improved process for preparing silver nanoparticles.

STATEMENTS OF INVENTION

The invention provides a process for producing nanoparticles comprising the steps of:
  preparing silver seeds in the presence of a water soluble polyanionic polymer; and
  growing the silver seeds to form nanoparticles.

The polyanionic polymer may be a sulphonated polymer, for example a derivative of poly(styrene sulphonate). The derivative may be an inorganic salt of poly(styrene sulphonate). The derivative may be a monovalent salt of poly(styrene sulphonate).

The polymer may be poly(sodium styrenesulphonate) (PSSS), for example a PSSS with a molecular weight between about 3 KDa to about 1,000 KDa, such as a PSSS with a molecular weight of about 1,000 KDa. Other soluble salts of poly(styrene sulphonate) may be used for example, potassium.

The polymer may be a copolymer of a substituted styrene sulphonate such as poly(styrene sulphonate-co-maleic acid) and derivatives thereof, especially an inorganic monovalent salt thereof, in particular poly(sodium styrene sulphonate-co-maleic acid).

The polymer may be a derivative of anethole sulphonate, especially poly(sodium anethole sulphonate).

The polymer may be a derivative of poly(vinyl sulphate), especially poly(potassium vinyl sulphate).

The polymer may be a derivative of poly vinyl sulphonate, especially poly(sodium vinyl sulphonate).

The polyanionic polymer may be a carboxylated polymer, especially poly(sodium acrylate).

The polymer may be present in the silver seed preparation at a concentration between about 0.2 mg/l to about 2 g/l. For example the concentration of polymer in the silver seed preparation may be about 12.5 mg/l.

The step of preparing silver seeds may be carried out at room temperature.

The step of growing the silver seeds may be carried out at room temperature.

About 95% of the nanoparticles formed by the process described herein may be nanoprisms.

BRIEF DESCRIPTION OF THE DRAWINGS

The invention will be more clearly understood from the following description of an embodiment thereof, given by way of example only, with reference to the accompanying drawings, in which.

All TEM images were taken using a JEOL JEM-2100 LaB$_6$.

DETAILED DESCRIPTION

We have developed a synthesis for silver nanoparticles that enables the selective production of nanoprisms (>95%) under very mild conditions and does so with a high degree of reproducibility.

The invention solves the problem of a lack of availability of a thermal synthetic procedure that selectively produces (>95%) silver nanoprisms in high yield in a rapid and reproducible manner, under mild conditions (room temperature and water as solvent)

We have found that the use of a polyanionic polymer such as poly(sodium styrenesulphonate) (PSSS) in the seed production step has the advantage of ensuring high quality silver nanoparticles when mild growth conditions are employed. The lack of a polymer or any other growth directing agent in the growth step may be advantageous for future functionalization of the particles.

The lateral dimensions of the triangular nanoparticles can be controlled by adjusting the extent of growth. This is controlled by adjusting the number of seeds in the reaction, which in turn is determined by the volume of seed solution used in this growth stage. There is a linear relationship between the position of the in-plane dipole plasmon band and the dimensions of the nanoparticles.

The ultimate size of the nanoprisms can be tuned by controlling the ratio of silver ion:silver seed in the growth step. For example for the samples 1 to 10 described herein the following ratios may be used:

TABLE 1

Figure 4:
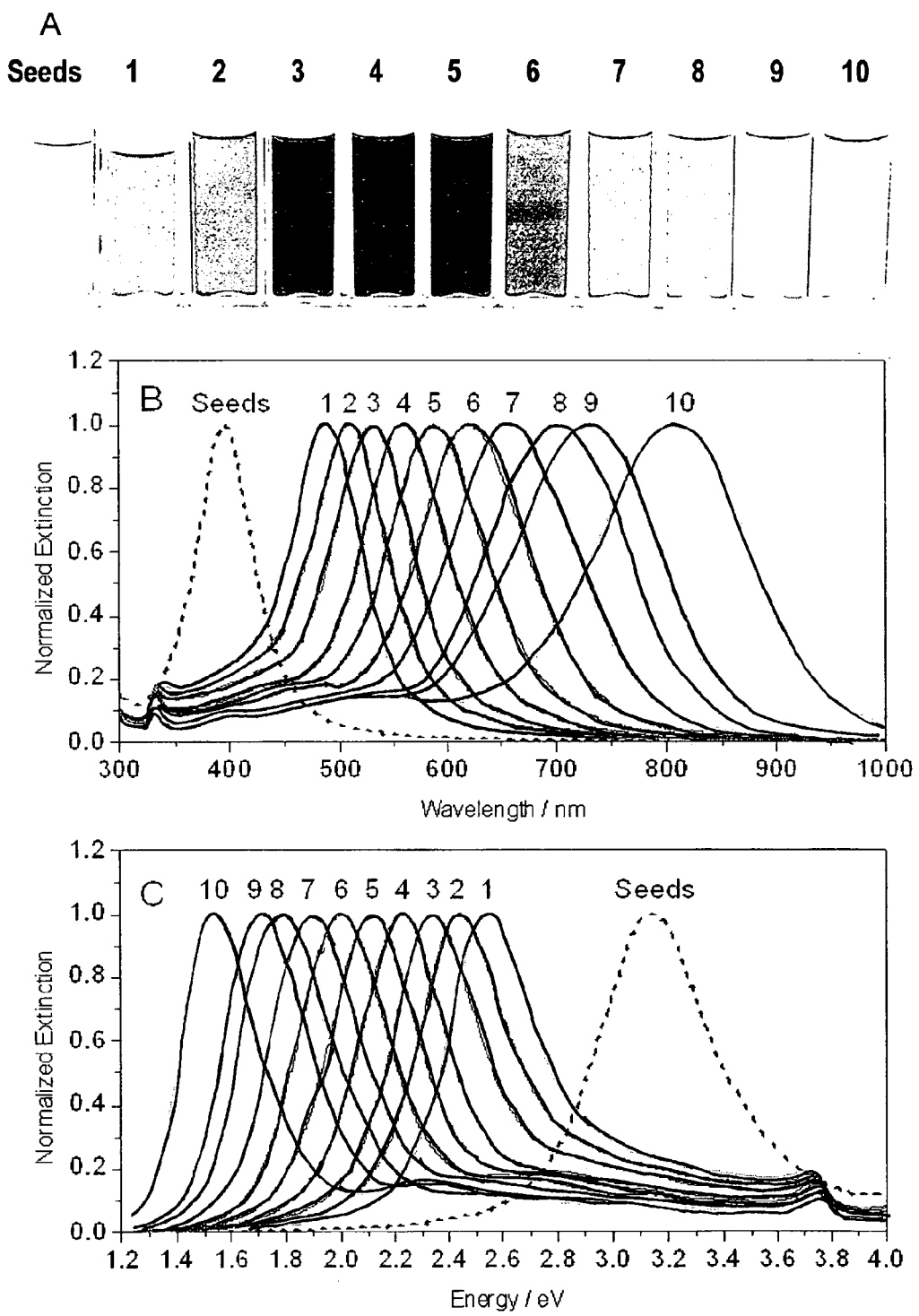
FIG. 4 A) is a photograph of a series of samples (1 to 10) illustrating the range of colours obtained. The purple color in sample 10 is largely the result of extinction by the in-plane quadrupole. B) is a normalized spectra of a series of as prepared samples obtained using different volumes of seed solution: 1) 650 μl, 2) 500 μl, 3) 400 μl, 4) 260 μl, 5) 200 μl, 6) 120 μl, 7) 90 μl, 8) 60 μl, 9) 40 μl, 10) 20 μl. C) is a spectra from (B) plotted against energy.

| | mole ratio of silver seed to silver ion | |
|---|---|---|
| Sample No. | Colour of sample in FIG. 4A | Mole ratio of silver seed:silver ion |
| Seeds | Yellow | — |
| 1 | Orange | 1:9.74 |
| 2 | Red | 1:12.71 |
| 3 | Pink | 1:15.82 |
| 4 | Purple | 1:24.35 |
| 5 | Royal blue | 1:31.65 |
| 6 | Blue | 1:52.82 |
| 7 | Turquoise | 1:70.24 |
| 8 | Aquamarine | 1:105.63 |
| 9 | Light blue | 1:158.23 |
| 10 | Lilac | 1:316.46 |

Figure 11:
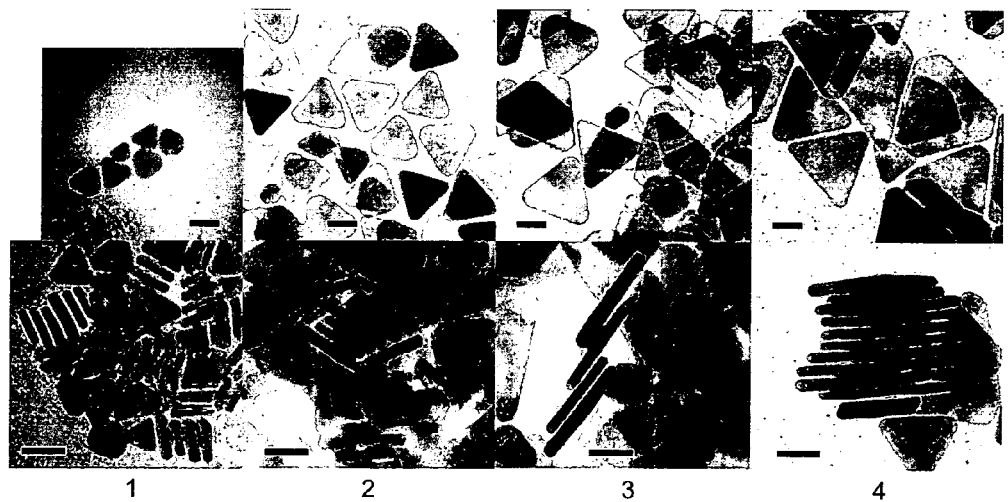
FIG. 11 shows TEM images of flat-lying and stacked silver nanoprisms for samples 1 to 4. There is a clear trend of increasing edge-length of nanoprisms with the spectral position of the main SPR as shown in FIG. 3A. Scale bars are 20 nm.

Examples of four samples (1 to 4) with TEM analysis are shown in FIG. 11. The series of successively larger nanoprisms were synthesised according to the process described in this example with volumes of seed solution of 650 µl, 300 µl, 150 µl and 130 µl.

We describe a rapid and readily reproducible seed-based method for the production of high quality silver nanoprisms in high yield (at least 95%). The edge-length and the position of the main plasmon resonance of the nanoprisms can be readily controlled through adjustment of reaction conditions. From UV-Vis spectra of solutions of the nanoprisms, the inhomogeneously broadened line width of the in-plane dipole plasmon resonance is measured and trends in the extent of plasmon damping as a function of plasmon resonance energy and nanoprism size have been elucidated. In-depth analysis of the lamellar defect structure of silver nanoprisms confirms that the defects can lead to a transformation of the crystal structure in the vicinity of the defects. These defects can combine give rise to lamellar regions, thicker than 1 nm, that extend across the crystal, where the silver atoms are arranged in a continuous hcp structure. This hcp structure has a periodicity of 2.50 Å, thus explaining the 2.50 Å lattice fringes that are commonly observed in <111> oriented flat-lying nanoprisms.

Figure 6:
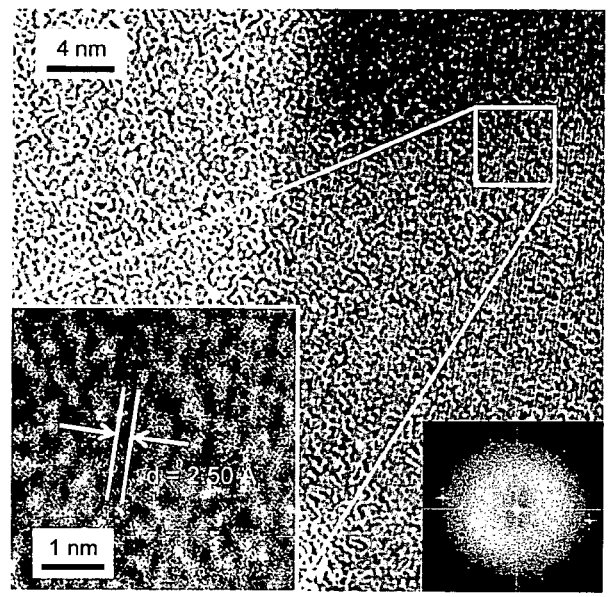
FIG. 6 is a TEM image of a flat-lying nanoprism. A close-up in the bottom left clearly shows the 2.5 Å spacing between lattice fringes. The inset at bottom right is a Fourier transform of the whole image.

The thermal synthetic procedure described herein selectively produces (>95%) silver nanoprisms in high yield in a rapid and reproducible manner; and under mild conditions (room temperature and water as solvent). TEM analysis of these nanoprisms has yielded direct evidence of a defect-induced arrangement of silver atoms that not only results in a hcp structure in the vicinity of the defects but also results in multiple defects combining to yield a continuous hcp lamellar region of about 1.5 nm in thickness. This hexagonal arrangement of atoms propagates perpendicular to the flat {111} face of the nanoprism with a spacing of 2.5 Å and thereby explains the commonly observed 2.5 Å lattice fringes in flat-lying silver nanoprisms as shown in FIG. 6.

Nanoparticles of noble metals such as silver are of considerable interest in nanotechnology. This stems largely from the collective oscillation of the conduction electrons in resonance with certain frequencies of incident light, leading to an extinction known as a surface plasmon resonance (SPR). The spectral position of the resonance is highly dependent on nanoparticle size and shape and also depends on the refractive index of the metal and the surrounding medium.

One of the key, and most interesting, properties of highly-shaped metal nanoparticles is the fact that at the SPR of a metal nanoparticle, the electric field intensity near the surface of the nanoparticle is enhanced strongly relative to the applied field. Two potential applications of this field enhancement are Surface Enhanced Fluorescence (SEF) and Surface Enhanced Raman Spectroscopy (SERS). The degree of enhancement is dependent on a number of factors. One of these is shape. It has been shown by discrete dipole approximation (DDA) calculations that nanorods and nanoprisms show a much higher degree of enhancement of the local field than spheres. Recently, electron energy-loss spectroscopy (EELS) has permitted high-resolution probing of the SPR on metal nanorods and nanoprisms and has generated results consistent with the optical spectra and calculations.

Another factor that affects the field enhancement is damping of the surface plasmon, which is characterized by the dephasing time, $T_2$. The field enhancement factor, $|f|$ is directly proportional to the dephasing time $T_2$, of the SPR ($|f| \alpha T_2$), where $T_2 = 2\hbar/\Gamma_{hom}$ and $\Gamma_{hom}$ is the homogeneous line width. Damping of the plasmon occurs through either non-radiative decay (absorption), or transformation of the plasmon into photons (scattering), known as radiation damping, i.e. $\Gamma_{hom} = \Gamma_{rad} + \Gamma_{non-rad}$. Accordingly, the suitability of certain nanoparticle morphologies for applications that rely on field enhancement can be estimated from measurements of the homogeneous line width of individual nanoparticles. For example, a series of experiments comparing nanospheres and nanorods has shown that nanorods typically display dramatically reduced plasmon damping compared to spheres, i.e. narrower line widths, and therefore produce a stronger field enhancement. At low plasmon resonance energies this difference is a result of the nanorods exhibiting much lower radiation damping. This is because the nanorods have a much lower volume than the corresponding nanospheres with the same plasmon resonance energy, and the radiative dephasing rate (radiation damping) is proportional to nanoparticle volume, i.e. $\Gamma_{rad} \alpha V$. Since different nanoparticle shapes result in different nanoparticle volumes for a given plasmon resonance energy, it is clear that the degree of plasmon damping is highly influenced by nanoparticle shape and this is another route for nanoparticle shape to influence the degree of enhancement of the local field. The non-radiative contribution to plasmon damping increases with increasing plasmon resonance energy due to the frequency-dependent dielectric properties of silver.

Similarly, more recent experiments have shown that line widths for the SPRs of Au—Ag nanoboxes are much broader than those of gold nanorods with comparable plasmon resonance energies. In addition, Munechika et al J. Phys. Chem. C 2007, 111, 18906 have studied the line widths of scattering spectra of individual silver nanoprisms and found that the line widths increase both as the particle volume increases and as the plasmon resonance energy increases.

Potential applications such as SEF and SERS are the driving force for the development of synthetic approaches that involve a high-degree of control over the final nanoparticle morphology. Silver nanoprisms have received considerable attention as the in-plane dipole SPR can be tuned across the entire visible spectrum from ~400 nm to the near infra-red (NIR). The syntheses that exist for the production of silver nanoprisms can be generally placed into either of two categories: photochemical (plasmon-driven synthesis) and thermal. Photochemical syntheses have produced the highest quality samples to date but this approach typically involves days for the preparation of a sample. Thermal approaches are much quicker but often produce samples with a range of shapes and sizes.

There has been extensive research investigating the different factors that influence particle size and shape. Until recently, some explanations for the existence of anisotropic growth in an isotropic medium were based upon the assembly of surfactant molecules into a template whose shape then defines the growth of the crystal, particularly for nanorods and nanowires. It has been more commonly thought that there is preferential adsorption of organic molecules, such as polymers and surfactants, to less stable crystal faces such as {100} and {110}. In this model, there is a much faster rate of addition of metal atoms at to the more exposed faces, resulting in preferred growth directions. For example the preferred binding of polyvinylpyrrolidone (PVP) to the {100} side faces of decahedral silver nanoparticles leading to silver nanowires with 5-fold symmetry due to growth on the {111} end faces and to the {100} faces of single crystal silver nanoparticles leading to silver nanocubes as a result of the faster growth on the {111} faces; the preferential adsorption of cetyltrimethylammonium bromide (CTAB) surfactant on the {100} side faces of decahedral gold nanoparticles leading to gold nanowires with 5-fold symmetry due to growth on the {111} end faces; the preferential adsorption of CTAB-Ag⁺ on the {100} and {110} side faces of single crystal gold nanoparticles leading to single crystal nanorods due to preferred growth on the mostly {111} end faces; the preferential adsorption of cetyltrimethylammonium tosylate (CTAT) on the {100} faces of decahedral silver nanoparticles leading to silver nanorods with 5-fold symmetry. In addition, recent computational work has been successful in predicting anisotropic growth based on the face-selective binding of surfactants.

Nevertheless, even for these examples, it is clear that the anisotropic growth that results from the preferential binding of organic species to certain crystal faces relies on the underlying twinning or defect structure of the seed particles since this is what determines the type and orientation of the crystal faces that are exposed to the growth medium. This is all the more apparent when we consider that in most syntheses a range of particle shapes are observed and yet the same shaped particle can be the major product of very different syntheses. Furthermore, anisotropic structures such as nanoprisms present a particular challenge to the face-selective binding model in that gold and silver nanoprisms typically have large flat {111} faces, with two-dimensional growth from the edges. Many syntheses for nanoprisms take place in the presence of such stabilizers as PVP or surfactants, yet unlike the nanowire, nanorod and nanocube examples listed above, growth is restricted in the <111> direction. This would suggest that it is quite possible that the organic stabilizers that are often present in the syntheses of nanoprisms provide a general stabilization of the growing nanoprisms and may play little or no shape-directing role.

Indeed, the internal defect structure has been implicated as a direct factor influencing crystal growth. Specifically, defects such as twinning that arise during the early stages of particle formation give rise to preferred growth directions where the defects are exposed to the growth medium. In the case of nanoprisms, parallel stacking faults in the <111> direction have been observed with these making contact with the growth medium at the edges, precisely where growth occurs. The silver halide growth model has also been resurrected as a way of explaining particle growth in many synthesis methods. In this model, twin planes form reentrant grooves, which are favorable sites for the attachment of adatoms. A single twin plane is expected to direct growth in two dimensions but limit the final size of the nanoprism, while the presence of two parallel twin planes would allow the fast growing edges to regenerate one another, allowing shapes such as hexagonal nanoplates to form. Very recently, Rocha and Zanchet in J. Phys. Chem. C 2007, 111, 6989 have studied the defects in silver nanoprisms in some detail and have shown that the internal structure can be very complex with many twins and stacking faults. These defects are parallel to each other and the flat {111} face of the nanoprism, subdividing it into lamellae which are stacked in a <111> direction, and are also present in the silver seeds. In that paper, it was demonstrated how the planar defects in the <111> direction could give rise to local hexagonally close-packed (hcp) regions. These would in turn explain the 2.50 Å lattice fringes that are observed in <111> orientated nanoprisms, which have hitherto been attributed to formally forbidden ⅓{422} reflections.

We describe a thermal synthetic procedure that selectively produces (>95%) silver nanoprisms in high yield. The as prepared samples are sufficiently monodisperse that important features of the SPR of silver nanoprisms are visible. Trends in the evolution of the degree plasmon damping as a function of plasmon resonance energy and nanoprism size can be elucidated through analysis of the UV-Vis spectra. The TEM data reveals that the defects have a significant impact on the crystal structure of silver nanoprisms and have important implications for understanding of the role of defects in the anisotropic growth mechanism for silver nanoprisms.

We describe a method for silver nanoprism synthesis that is a seed-based thermal synthetic procedure that selectively produces (>95%) silver nanoprisms in a rapid and reproducible manner; and under very mild conditions (room temperature and water as solvent). The method involves the silver seed-catalyzed reduction of $Ag^+$ by ascorbic acid, and surprisingly results in a minimal concentration of spherical nanoparticles being produced. The spectral position of the SPR can be tuned by controlling the size of the nanoprisms, without any significant variation in thickness. This can be achieved through adjustment of the number of seeds in the growth mixture.

Figure 1:
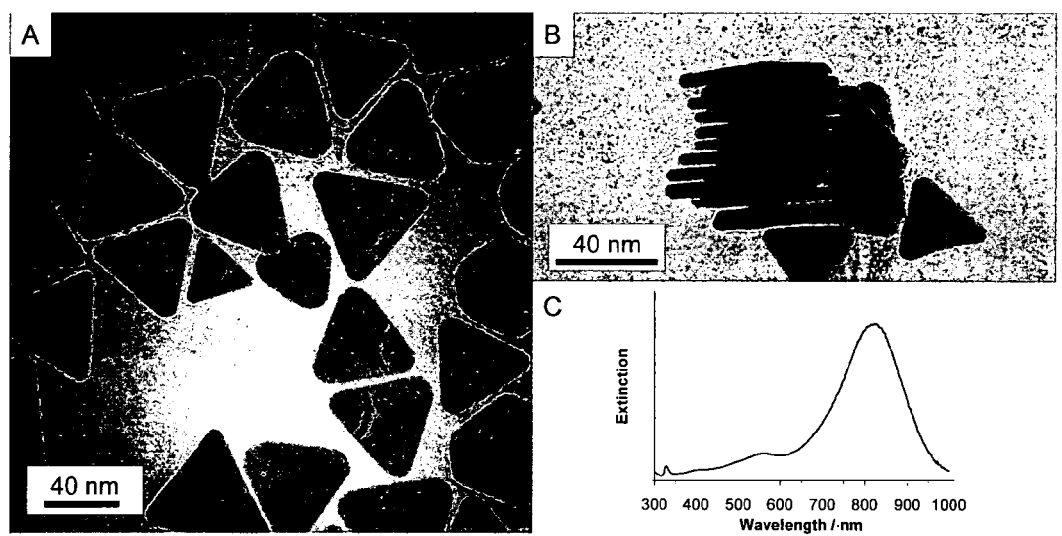
FIG. 1 A) is a TEM image of flat-lying silver nanoprisms from a typical sample. B) is a TEM image of silver nanoprisms from another sample, made by the same procedure, that are stacked together and are oriented such that they are standing vertically on their edges. C) is a UV-Vis spectrum of sample of nanoprisms shown in (A) showing the main SPR (in-plane dipole) at ~825 nm.

A typical example of the nanoprisms produced with this method is shown in FIG. 1.

Figure 2:
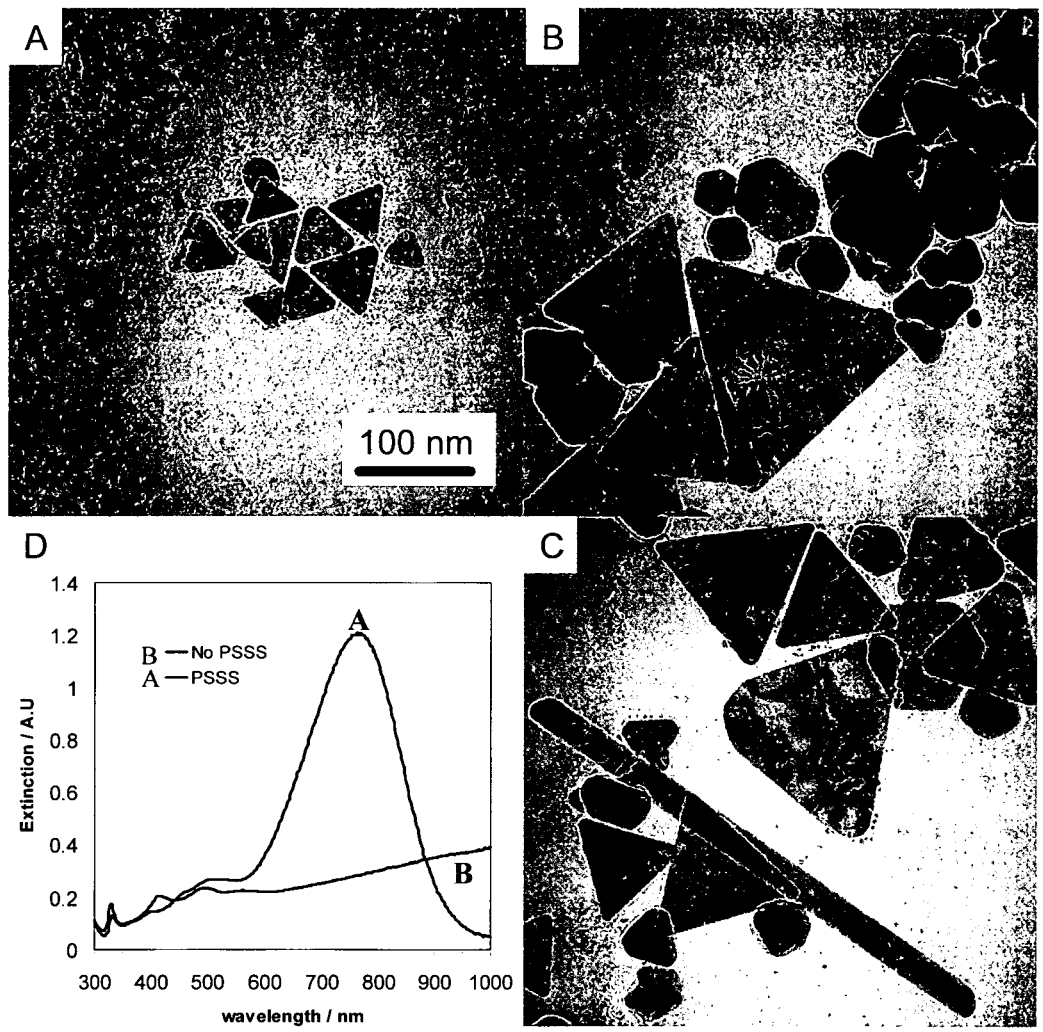
FIG. 2 A) is a TEM image from a sample of flat lying silver nanoprisms grown from seeds produced with PSSS present. B) and C) are TEM images of silver nanoparticles grown from seeds produced without PSSS present, the sample comprises nanoprisms of a wide range of sizes and "spherical" particles of various sizes with 5-fold symmetry present. A "nanotape" is also visible in (C). D) is a UV-Vis spectra of nanoprisms in (A) grown from seeds produced in presence of PSSS (labeled A) and nanoparticles in (B) and (C) grown from seeds produced in absence of PSSS (labeled B)

A key ingredient for production of high quality samples is a polyanionic polymer such as poly(sodium styrenesulphonate) (PSSS), which is used as a stabiliser in the seed production step. If a polyanionic polymer is left out or only added to the seed solution after seed production, then there is a diversity of nanoparticle shapes and sizes, this is shown clearly in FIG. 2. This result is important as it shows that the polyanionic polymer is not simply playing a shape-directing role through preferential adsorption to certain crystal faces during the growth stage, but rather it must have a strong influence on the defect structure of the seeds and indeed a preference for seeds whose structure predisposes them for growth into nanoprisms. We believe that the polyanionic polymer may interact relatively strongly with the silver surface thereby influencing the defect structure of the seeds.

Generally, the amount of citrate present in the synthesis of many of the samples is very low. For example, in a synthesis that uses 100 μl of seed solution there is 118 nmol of citrate in the solution during the growth step, while 1,500 nmol of $Ag^+$ is added. This contrasts with previously reported results which indicate that a low citrate/$Ag^+$ ratio (<1) resulted in triangular and hexagonal structures with a broad range of sizes (30 to 300 nm) while a high citrate/$Ag^+$ ratio (>1) was required for nanoprisms to be the major product. This was reasoned to be the result of citrate likely effecting the face-selective growth by adsorbing more strongly to the flat {111} face of the nanoprisms. Here, analysis of samples by UV-Vis indicates that increasing the amount of citrate used in the synthesis does not increase the anisotropy of the nanoprisms. The high-quality nanoprisms we have obtained with relatively low quantities of citrate present indicate that it is more likely that the defect structure of the seeds, rather than the presence of citrate in the growth step, is the basis for anisotropic growth into nanoprisms. Referring to FIGS. 2B and C, when the amount of citrate is relatively high in the seed production step and even when PSSS is absent highly shaped nanoparticles are still obtained. Citrate may therefore play an important role in anisotropic growth by influencing the defect structure of the seeds. However when citrate is used in the absence of a polyanionic polymer such as PSSS nanoparticles having a variety of different shapes are produced. The advantage of using a polyanionic polymer such as PSSS is that nanoparticles having a predominantly triangular shape are produced.

Figure 3:
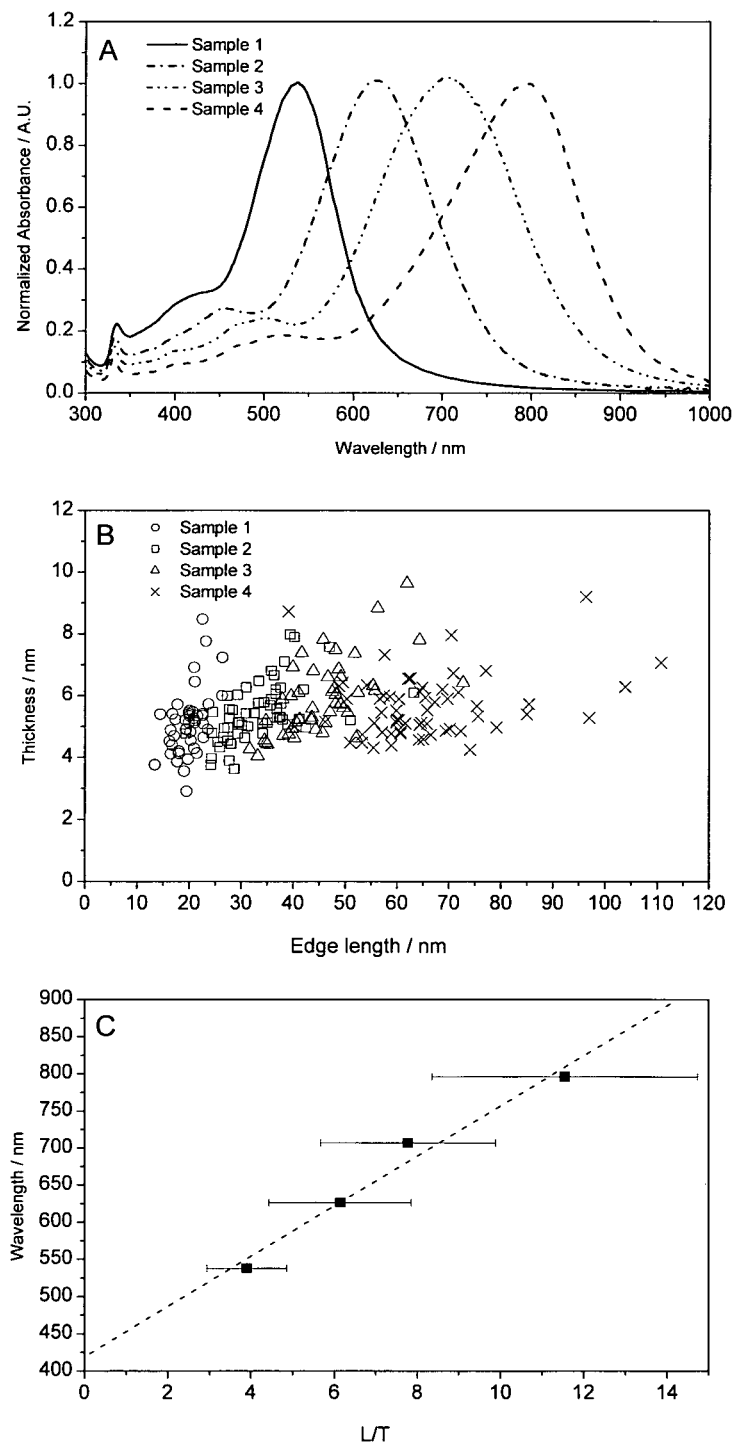
FIG. 3 A) is a UV-Vis spectra of 4 samples (1 to 4) of nanoprism. B) is a plot of size data for silver nanoprisms from each of the 4 samples of (A). C) is a plot of data (squares) for the position of the main SPR (in-plane dipole) against edge-length (L) divided by thickness (T) for the four samples of (A). The dashed line is a linear fit to the data. The edge-length and thickness were obtained by measuring the dimensions of vertically oriented nanoprisms. The average thickness (T) of all samples is approximately 5.5 nm. The error bars represent the uncertainty in L/T that arises for the standard deviation of measurements of the edge-length and thickness of the nanoprisms.

To characterise the nanoprisms produced by this method and explore the relationship between nanoparticle dimensions and the position of the main SPR, TEM analysis of statistically significant numbers of nanoprisms from four samples was carried out. The positions of the main SPRs of these samples were well separated as can be seen in FIG. 3A. TEM grids of samples were prepared such that many of the particles were arranged in a stacked formation with their flat faces parallel to the electron beam. To achieve this it was necessary to concentrate the nanoprisms by centrifugation so that it was possible to measure both their edge-length and thickness. The edge-length measurement has a certain degree of uncertainty as it is possible that some nanoprisms are free to rotate about the <111> axis perpendicular to the flat faces of the nanoprisms, although most are probably resting on an edge in the plane of the TEM grid. The nanoprism measurement data are shown in FIG. 3B and in Table 2, it is clear from this data that there is a distribution of nanoparticle thicknesses within any sample but that the average thickness of nanoprisms from each sample is approximately the same for each sample. The edge-length, on the other hand, displays a clear trend; nanoprisms from each sample have higher average edge-lengths as the spectral position of the main SPR increases.

Examples of TEM images of nanoprisms from samples 1 to 4 are shown in FIG. 11 which demonstrates that the triangular shape of the nanoprisms is established early on in the growth process and that growth proceeds through enlargement of these nanoprisms.

According to theory, the position of the band should depend linearly on edge length and on the inverse of the thickness. Indeed, by plotting the $\lambda_{max}$ against L/T, where L is the nanoprism edge-length and T is the nanoprism thickness, we find a linear relationship as can be seen in FIG. 3C. It is possible to express the edge-length (L) as a function of thickness (T) and the spectral position of the main SPR ($\lambda_{max}$) using Equation 1:

$$\lambda_{max} = 33.8\left[\frac{L}{T}\right] + 418.8 \quad \text{(Equation 1)}$$

$$\Rightarrow L = T\left[\frac{\lambda_{max} - 418.8}{33.8}\right]$$

To study the optical properties of the nanoprisms, a series of samples of increasing edge-length was prepared. These samples display a progression in color as the main SPR is increasingly red-shifted as the nanoprism edge-length increases. These samples are shown in FIG. 4A with the spectra shown in FIG. 4B and replotted against energy in FIG. 4C. Since the spectra were obtained from taking UV-Vis measurements of an ensemble of nanoprisms in solution with a distribution of sizes, all the spectra are inhomogeneously broadened. This means that it is not possible to obtain absolute information about the dephasing time of the plasmons by measuring the line widths (FWHM) of the spectra. However, it is possible to observe how the inhomogeneously broadened line widths vary as a function of plasmon resonance energy and nanoprism volume.

In FIG. 5A, the line widths (FWHM) of each of the SPRs from FIG. 4C are plotted against plasmon resonance energy. It can be seen that the width of the main SPR (in-plane dipole) increases as the energy of the resonance increases. This is consistent with measurements of the scattering spectra of individual silver nanoprisms by Munechika et al who showed that the line width of the SPR of individual nanoprisms increased with plasmon resonance energy and that this was also correlated with nanoprism volume. Overall, this trend of increasing line width could be explained as due to both increased radiation damping and increased non-radiative decay.

Figure 5:
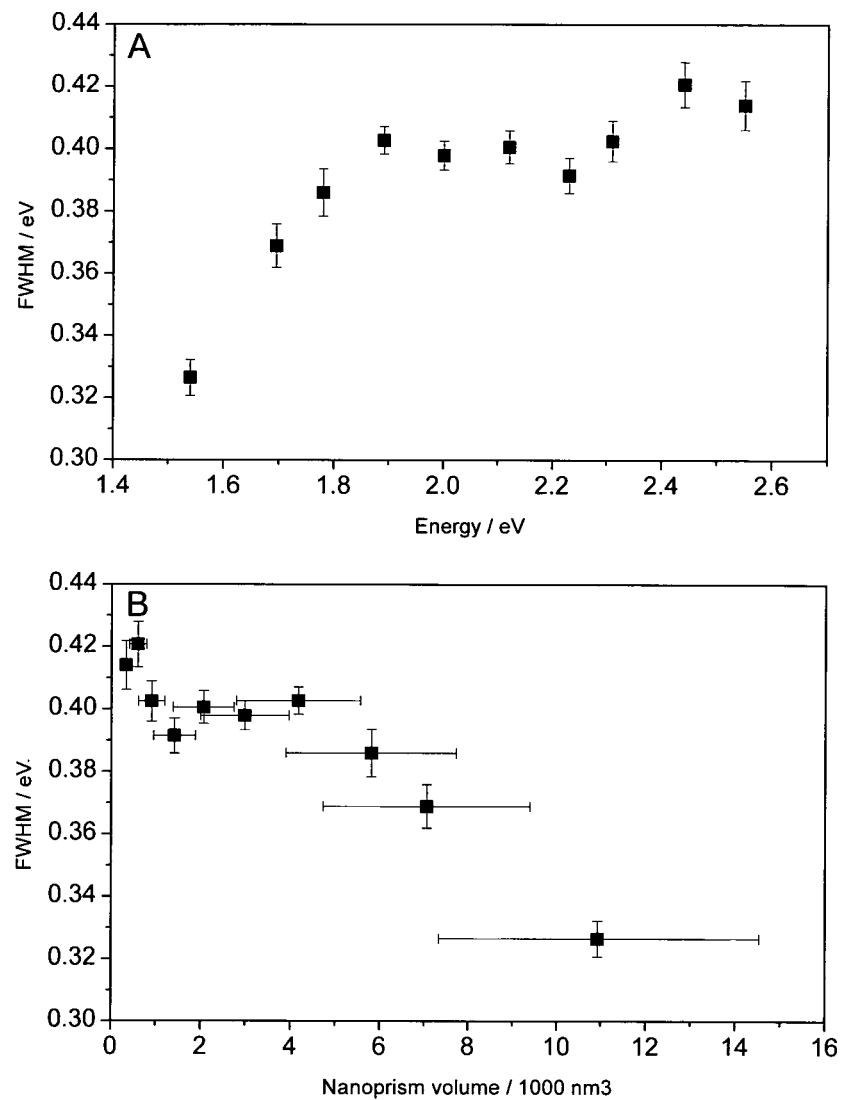
FIG. 5 A) is a graph showing the FWHM of the SPRs plotted against plasmon resonance energy for each of the nanoprism samples (1 to 10). B) is a graph showing the FWHM of the SPRs plotted against nanoprism volume for each of the nanoprism samples (1 to 10). A standard deviation of 19% (based on data in Table 2) for edge-length and 1 nm uncertainty for thickness was used to generate the error bars for nanoprism volume.

In FIG. 5B, the SPR line widths are plotted against nanoprism volume and it can be seen that in our samples the line widths of the SPRs decrease as nanoprism volume increases (the SPR energy scales inversely with nanoprism edge-length). The TEM studies of FIGS. 1 to 5 show that as the particles become larger, there is no decrease in polydispersity of the samples, i.e. no focusing of the growth conditions to produce a sample with a narrower size distribution. In fact, there is a steady increase in the edge-length distribution as edge-length increases, see Table 3, yet the line widths decrease. This means that the narrowing of the line widths with increasing nanoprism volume must be due to a narrowing of the line widths of the SPRs of the individual silver nanoprisms in the samples with increasing size.

TABLE 2

Sizing data for samples 1 to 4.

| Sample | Edge-length [nm] | $\sigma_{Edge\text{-}length}$ | Thickness [nm] | $\sigma_{Thickness}$ | $\lambda_{max}$ [nm] |
|---|---|---|---|---|---|
| 1 | 20 | 3 | 5.1 | 1.1 | 538 |
| 2 | 33 | 7 | 5.4 | 0.9 | 626 |
| 3 | 46 | 8 | 5.9 | 1.2 | 707 |
| 4 | 65 | 14 | 5.6 | 1.0 | 796 |

The degree of radiation damping increases with nanoparticle volume, so the degree of radiation damping must be increasing. However, since the line widths narrow with increasing volume, this indicates that there is an overall decrease in plasmon damping. Therefore there must be a decrease in non-radiative damping that far outweighs any increase in radiation damping. Thus the degree of radiation damping in these nanoprisms must be very small. This behaviour is very similar to that observed in gold nanorods with a narrow range of diameters but with a large range of aspect ratio. On the other hand, Munechika et al. show that the line widths of the SPRs obtained from their individual silver nanoprisms increase with nanoprism volume.

Figure 12:
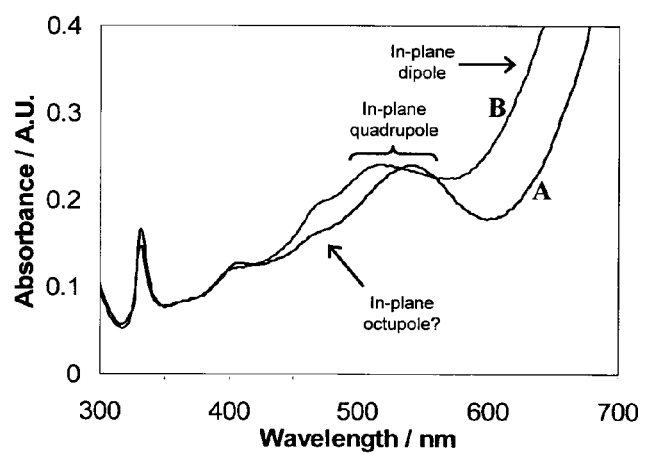
FIG. 12 is a spectra of sample 10 from FIG. 4B (line A) and of sample 4 from FIG. 3A (line B). The in-plane quadrupole SPRs are clearly visible with a shoulder at ~465 nm that is tentatively assigned as an in-plane octupole SPR. The out-of-plane dipole and quadrupole SPRs are visible at ~400 nm and ~330 nm respectively.

If the in-plane dipole SPR is sufficiently red-shifted and the samples are sufficiently monodisperse, then the in-plane quadrupole SPR should be visible. This is clearly the case for many of the spectra in FIG. 4A. Calculations have shown that as silver nanoprisms get even larger, higher order multipole resonances should become visible. Higher order multipole resonances in nanorods are well documented and have also been observed in silver nanospheres. A closer look at some of the spectra for the samples of our largest nanoprisms show a shoulder on the in-plane quadrupole resonance at ~465 nm (see FIG. 12). While this could possibly be due to extinction by another species we provisionally assign this as an in-plane octupole resonance.

Optical properties aside, the structural properties of silver nanoprisms are a source of much interest. The TEM analysis of these nanoprisms in this Example provides direct evidence of a defect-induced arrangement of silver atoms that not only results in a hcp structure in the vicinity of the defects but also in multiple defects combining to yield a continuous hcp lamellar region of about 1.5 nm in thickness. As shown in detail below, this hexagonal arrangement of atoms propagates perpendicular to the flat {111} face of the nanoprism with a spacing of 2.50 Å and thereby explains the commonly observed 2.50 Å lattice fringes in flat-lying silver nanoprisms as shown in FIG. 6.

To investigate this possible hcp arrangement of atoms we have performed detailed TEM studies of vertically oriented silver nanoprisms. A typical sample of flat-lying nanoprisms is shown in FIG. 1A. For a defect in the <111> direction to be observed in the TEM, it is necessary that the nanoprism is oriented such that a {110} plane is in the plane of the image. In this orientation, two {111} planes and a {100} plane are aligned vertically with respect to the electron beam. The defects can then be detected as discontinuities in either the {100} or {111} planes that propagate away from the flat face of the nanoprism. This is illustrated schematically in FIG. 7.

Figure 7:
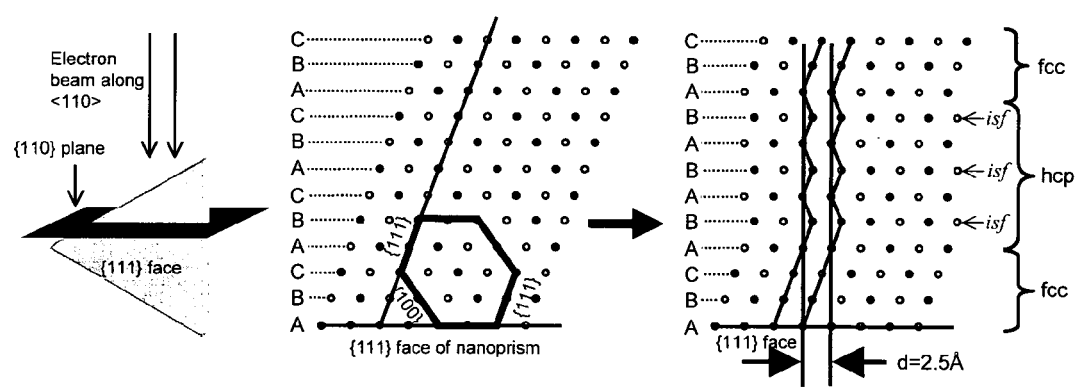
FIG. 7 is a schematic illustrating how intrinsic stacking faults along <111>, i.e. faults in the successive stacking of the ABC layers ({111} planes) of an fcc crystal, give rise to a hcp region. The black dots represent atoms in the {110} plane while the grey dots represent atoms immediately below.

For the correct orientation to occur, the nanoprisms firstly need to be vertically orientated as in the stacked formation as shown in FIG. 1B and secondly need to have one edge parallel to the electron beam (see the left hand side of FIG. 7). This means that few nanoprisms will have the {110} plane correctly aligned since most nanoprisms are probably resting on one of their edges on the TEM grid. However, some nanoprisms do have the right orientation and a layered defect structure is visible in two of the stacked silver nanoprisms in FIG. 8A. Closer inspection of the nanoprism on the right reveals that it is indeed being observed along <110> as the internal defect structure of the crystal is visible (FIG. 8B). An analysis of the defects is shown in FIG. 8C. The flat {111} face of the nanoprism is clearly indicated and lattice fringes corresponding to {111} planes can be seen propagating away from the face of the nanoprism, parallel to the {111}-labeled side of the hexagon. The spacing between these fringes was measured to be 2.35±0.05 Å, the correct spacing for {111} planes. Further away from the face of the nanoprism, these {111} planes show discontinuities due to repeated stacking faults between the {111} planes parallel to the face of the nanoprism. There is now an arrangement of atoms that propagates perpendicular to the flat face of the nanoprism, indicated by the two white lines. Significantly, this perpendicular arrangement of atoms has a periodicity of 2.50±0.05 Å, corresponding to the lattice spacing that is observed when a flat-lying nanoprism is observed along <111> (FIG. 6).

In fact, there are so many defects in the nanoprism here that a significant continuous portion of the crystal has a hcp arrangement; a lamellar region about 1.5 nm thick. This is highlighted by the superposition of a zigzag pattern on the TEM image in the top of FIG. 8C. Assigning each apex on this pattern to an atom in alternate A and B layers (atomic planes) of the hcp lattice, the average measured distance between an A and B layer in this region is 2.35 Å, which is the spacing between {111} planes in an fcc lattice, which are stacked in an ABCABC . . . configuration. Since the spacing between alternate layers in an ABABAB . . . configuration is the same as that in an ABCABC . . . configuration, each A and B point on the zigzag pattern therefore corresponds to atoms in alternate A and B layers of a hcp lattice.

The reconstruction of the silver lattice is illustrated schematically in FIG. 7. By introducing a series of intrinsic stacking faults (isf) it is easy to see how these defects give rise to an ABABAB . . . stacking arrangement of the atomic planes in a region of the nanoprism. The perpendicular arrangement of atoms with respect to the flat {111} face of the nanoprism is indicated and has a 2.50 Å spacing.

Figure 9:
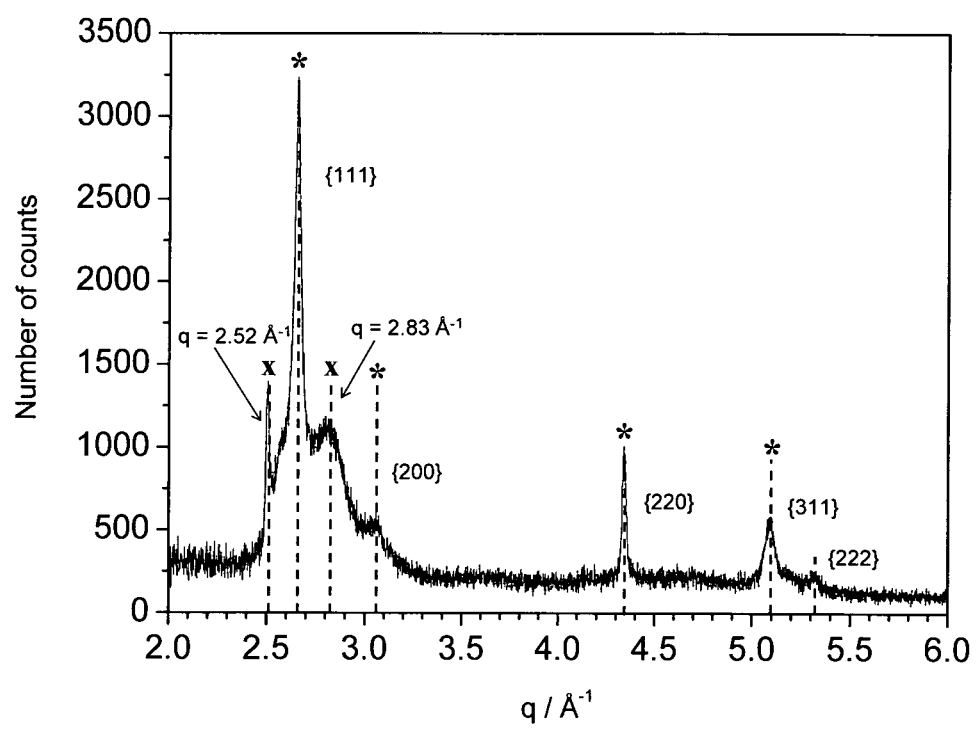
FIG. 9 is a graph showing X-ray diffraction data for silver nanoprisms, the peaks corresponding to fcc silver are labeled with * and the relevant miller indices. Two additional peaks (labeled with x) correspond to predicted positions from theoretical diffractograms, reported in the Supporting Information Section of reference 57 for a defect-induced hcp arrangement of silver atoms in silver nanoparticles.

Further evidence of the transformation of the crystal structure to hcp is provided by x-ray diffraction (XRD) data from our nanoprisms. These show peaks for the fcc silver lattice, as expected, but also show two further peaks corresponding to reflections that are predicted to arise from a hcp arrangement as indicated by Rocha and Zanchet. This is shown in FIG. 9.

Figure 8:
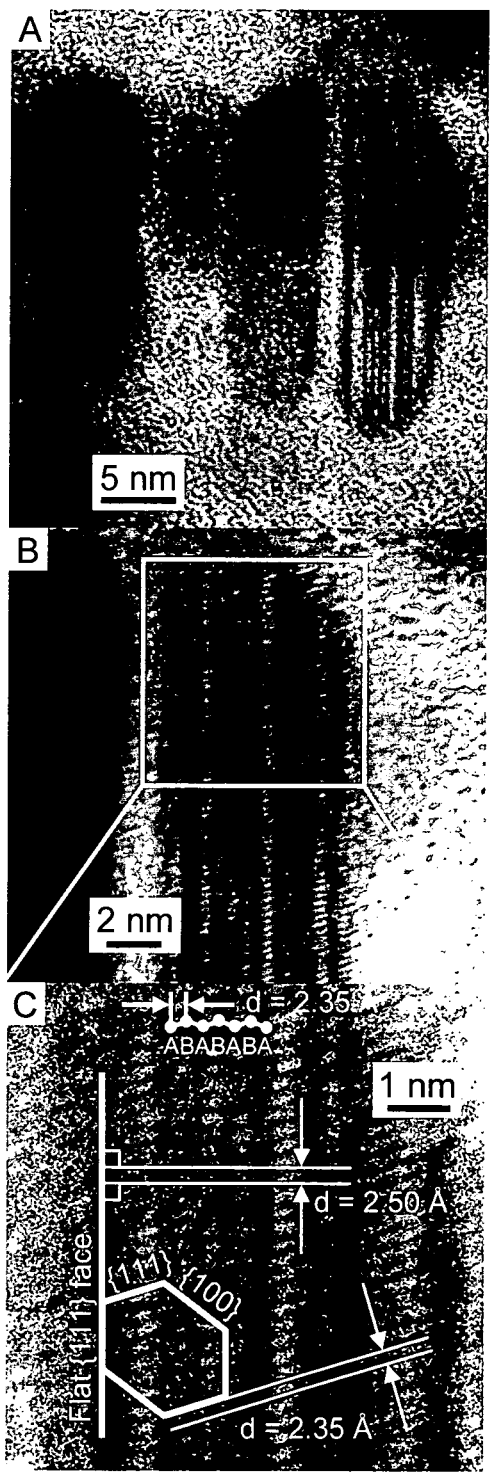
FIG. 8 A) is a TEM image of a stack of vertically oriented silver nanoprisms. B) is a high resolution image of the nanoprism on the right hand side of (A) showing defect structure. This nanoprism is oriented such that the {110} plane is in the plane of the image, i.e. the electron beam is along <110>. C) shows the analysis of internal structure of nanoprism in (B). A series of intrinsic stacking faults has resulted in a hexagonally close packed pattern emerging and gives rise to an arrangement of atoms that is aligned perpendicular to the surface with a spacing of 2.50 Å. The correct spacing of 2.35 Å has been obtained for {111} planes and also for the alternate ABAB . . . layers of the hcp region.

Since a significant portion of the nanoprism maintains its fcc structure, as evidenced by the TEM analysis in FIG. 8 and the XRD data, we cannot preclude observation of fcc lattice fringes in <111> oriented flat-lying silver nanoprisms. Indeed, this has proven to be the case with the recent observation of 1.44 Å lattice fringes in silver nanoprisms, arising from {220} reflections; and 1.24 Å lattice fringes in silver nanoprisms, arising from {311} reflections.

The familiar triangular shape and constant thickness of nanoprisms results from highly selective lateral growth from the edges. Due to the lamellar defect structure of the nanoprisms, it is precisely at these edges where the defects are exposed to the growth solution. Thus the significant rearrangement of the crystal structure described here very likely plays a crucial role in giving rise to two-dimensional growth. The hcp crystal faces (or defect-rich regions) at the edges must support a much faster rate for the addition of silver atoms during growth, compared to the {111} or {100} faces. Since the hcp structure is not the natural crystal structure for silver, it must therefore be less stable than the fcc structure, making it likely that the edges where the hcp structure is exposed to the growth medium are less stable than the {111} or {100} faces. This higher degree of instability may be the basis of the faster two-dimensional growth at the edges. The hcp and fcc crystal structures both have a hexagonal symmetry so it remains to be explained why triangles, and not hexagonal nanoplates, are the preferred outcome of two-dimensional growth.

Figure 10:
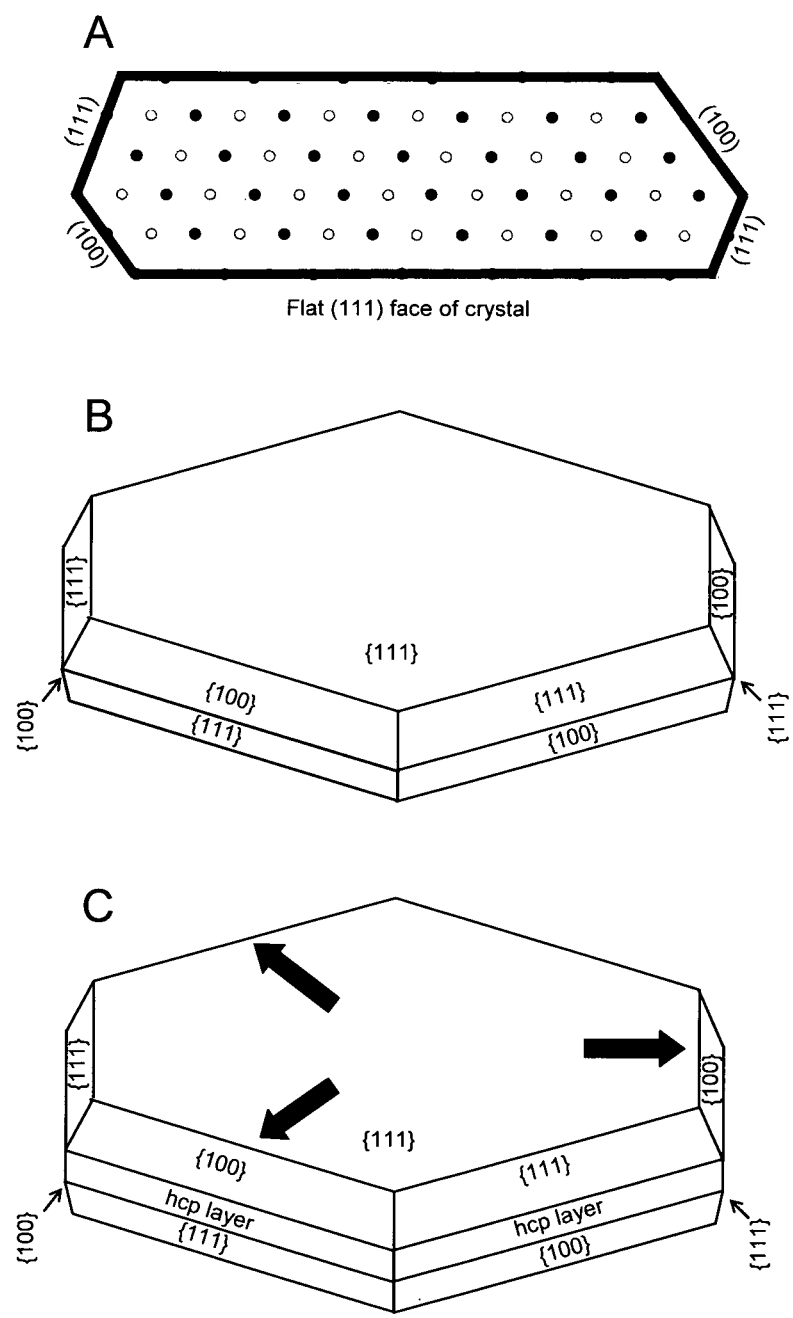
FIG. 10 A) is a schematic illustrating a <110> oriented segment of a fcc crystal. The edges of a crystal cut in this manner have alternating pairs of {100} and {111} faces. B) is a schematic of a nanoplate constructed from a single fcc crystal (no twin planes or defects). A singe crystal would not normally take up this structure but the schematic illustrates that a nanoplate cut from a fcc crystal could have edges consisting of alternating pairs of {100} and {111} faces. C) is a schematic of a nanoplate with a defect-induced hcp layer sandwiched between two fcc layers of unequal thicknesses. The hcp layer determines the lateral growth. Within the two-dimensional growth plane, certain directions are preferred due to the asymmetric distribution of crystal faces. The block arrows indicated the proposed directions of preferred growth that lead to the familiar triangular shape of nanoprisms.

To explain this let's consider a flat, <110> oriented, fcc single crystal as shown in the schematic in FIG. 10A. It is not proposed that a single fcc crystal would take up such an anisotropic structure, but it is clear that it can be cut such that opposite sides could have alternating {111}/{100} pairs of faces. The fcc crystal has six-fold symmetry around the <111> axis so a hexagonal platelet could have the alternating faces as outlined in FIG. 10B, although the relative sizes of each face at an edge would not necessarily be as fixed as the diagram suggests.

Next consider a more realistic version of a hexagonal nanoplate that could be the result of initial two-dimensional growth from the seed, see FIG. 10C. This possesses the hcp (or defect-rich) region sandwiched between two fcc regions, corresponding to what our TEM data suggest. The schematic is drawn such that the regions on either side of the central hcp region are asymmetric. The thickness of each fcc layer would then define the size of each of the respective crystal faces on each edge. This would mean that not all of the edges of the nanoplate are identical; three of them have a larger {100} face than the {111} face while the other three have a larger {111} face than the {100} face. We propose that the three edges with the larger, more stable {111} faces will grow more slowly than the other three, consistent with the lack of growth on the flat {111} face of the nanoprisms. The other three, with the larger, less stable {100} faces, will grow significantly faster, leading to the formation of a triangular nanoprism early on during growth. Thus, the asymmetry in thickness between the fcc layers on either side of the hcp layer defines triangular as opposed to hexagonal growth. After a triangular shape is formed, growth continues on the less-preferred edges with the smaller {100} faces, and as it does so, it opens up the preferred growth edges at the apices of the nanoprism for continued growth. Since these preferred edges always grow faster, the nanoprism maintains its triangular shape, with both types of edges growing in a concerted fashion. In this manner smaller triangular nanoprisms grow continuously into larger triangular nanoprisms without any significant increase in thickness. In cases where there is no asymmetry in thickness between the fcc layers on either side of the hcp layer, hexagonal nanoplates are expected.

At this point it is worth recalling the silver halide growth model, where anisotropic growth is promoted by the presence of twin planes in nanoparticle nuclei. At the edges of the nuclei where the twin plane is exposed to the growth medium, alternating concave and convex {111} surfaces are formed with growth occurring much faster on the concave surfaces, which grow themselves out of existence leaving a triangular nanoprism of a size defined by the size of the particle at the time of twinning. The presence of two twin planes can result in larger hexagonal nanoplates being formed. This silver halide model for anisotropic growth is not entirely consistent with our observations. Firstly, our analysis shows that several stacking faults can be present in a nanoprism and can even combine to yield continuous hcp regions. Secondly, our nanoprisms do not stop growing once the triangular shape has been established. As can be seen in FIG. 11, the triangular shape is established early on in the synthesis and larger nanoprisms can be formed, long after any concave surfaces at the edge would have grown out of existence, leaving only convex {111} surfaces. Yet in our samples, growth continues at the edges without any increase in nanoprism thickness, i.e. no growth on the flat {111} faces of the nanoprisms.

The faster growth on hcp and fcc {100} faces runs counter to what is normally observed in noble metal nanorod and nanocube syntheses that involve the use of surfactants or polymers to influence shape. As mentioned earlier, in these syntheses organic species tend to prefer to stick to less stable crystal faces such as {110} and {100} leading to preferred growth on {111} planes. We note that in our synthesis the amounts of potentially shape-directing organic species are very low. For example, PSSS is used to enhance the quality of the seeds during their synthesis, but even though growth is quite uncontrolled when it is completely absent, a very large fraction of the particles are anisotropic and are mostly nanoprisms and nanoplates. Also, as mentioned earlier, the amount of citrate used in the growth step of our synthesis is very low. It seems plausible therefore that in the absence of strongly coordinating species, the lower stability of {100} faces may lead them to grow faster than {111} faces.

We have devised a straightforward, non-photochemical, room temperature procedure for the synthesis of silver nanoprisms. The as prepared silver nanoprisms are sufficiently monodisperse that it has been possible to investigate trends in the extent and nature of plasmon damping through measuring the inhomogeneously broadened line width of the SPR from UV-Vis measurements. We have found that there is a decrease in plasmon damping with decreasing plasmon resonance energy, consistent with observations by other researchers. However, the decrease in plasmon damping is also associated with an increase in nanoprism size. Radiation damping scales with nanoparticle volume so the observed decrease in overall damping implies that the amount of radiation damping is small and whatever increase in radiation damping there is, it is outweighed by the decrease in non-radiative damping as the plasmon resonance energy decreases. These results indicate that, at least at low plasmon resonance energies, there is very little damping of the plasmons and that thin (~5 to 6 nm thick) silver nanoprisms are ideally suited for applications that rely on enhancement of the local field. This needs to be confirmed by measurements on individual nanoprisms of the homogeneous line width.

We have shown that silver nanoprisms possess many defects in the <111> direction perpendicular to the flat face of the nanoprisms and that these can combine to give rise to a hcp layer sandwiched between two fcc layers. This hcp layer has a periodicity of 2.50 Å that, provides an explanation for the commonly observed 2.50 Å lattice fringes in flat-lying nanoprisms. Furthermore, this two-dimensional hcp layer is most likely the main explanation for the two-dimensional lateral growth, with the triangular shape of the nanoprisms being driven by the asymmetric distribution of crystal faces at the edges, which is in turn determined by the asymmetric thicknesses of the fcc layers on either side of the hcp layer. The silver halide model is perhaps a good starting point for understanding anisotropic growth in as much as it identifies defects as crucial, however it apparently does not adequately explain the growth patterns of metal nanoprisms. We believe that the defect-induced arrangement of silver atoms into continuous hcp regions, as reported here, represents a significant insight into the growth mechanisms of anisotropic metal nanoparticles.

The invention is further illustrated with non-limiting examples given below.

Example 1

Preparing Silver Seeds

In a typical experiment, the seeds are produced by combining 5 ml of 2.5 mM aqueous trisodium citrate, 0.25 ml of 500 mg·L$^{-1}$ 1,000 kDa aqueous poly(sodium styrenesulphonate) (PSSS) and 0.3 ml of freshly dissolved 10 mM aqueous NaBH$_4$, followed by addition of 5 ml of 0.5 mM aqueous AgNO$_3$ at a rate of 2 ml·min$^{-1}$ while stirring continuously. Distilled water is used in the process and for all the solutions Example 2

Growing Silver Seeds

The nanoprisms are produced by combining 5 ml distilled water, 75 µl of 10 mM aqueous ascorbic acid and various quantities of seed solution followed by addition of 3 ml of 0.5 mM aqueous AgNO$_3$ at a rate of 1 ml·min$^{-1}$. After synthesis, 0.5 ml of 25 mM aqueous trisodium citrate is added to stabilize the particles and the sample is diluted with water as desired. The synthesis is complete after the 3 minutes required for addition of the AgNO$_3$ during which time the colour of the solution changes as the plasmon band red-shifts in response to nanoprism growth. Distilled water is used in the process and for all the solutions. The absorption spectrum was recorded on a UV/visible/NIR spectrometer and the more length of maximum absorbance ($\lambda_{max}$ in nm) and the full width half maximum (FHWM in nm) of the band were recorded.

Example 3

Preparation of Samples for X-Ray Diffraction Analysis

Samples were prepared for X-ray diffraction (XRD) measurements by concentrating a nanoprism sample by centrifugation. A viscous nanoprism mixture was prepared by adding the few drops of concentrated nanoprism solution to a few drops of aqueous 5% w/v poly(vinyl alcohol) (PVA). This was added to the glass slide for XRD analysis (Philips X'Pert Pro) and allowed to dry.

Example 4

Polyanionic Polymers

Using the same methodology as outlined above in examples 1 and 2 we have also made silver nanoprisms using the following polyanionic polymers. Seeds were prepared as in example 1 with 0.25 ml of 500 mg of polymer per liter. 100 µl of seed solution was used for the growth step (example 2).

| Modifier | Structure | $\lambda_{max}^{ave}$ | FWHM$^{avg}$ |
|---|---|---|---|
| poly (sodium styrene sulphonate) | PSSS 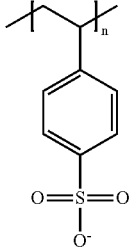 | 729 | 231 |

-continued

| Modifier | | Structure | $\lambda_{max}^{ave}$ | FWHM$^{avg}$ |
|---|---|---|---|---|
| poly (sodium styrene sulphonate-co-maleic acid) | PSSS-co-MA | [structure shown; R = H or Na] | 700 | 222 |
| poly (sodium vinyl sulphonate) | PSVS | [structure shown] | 799 | 294 |
| poly (sodium anethole sulphonate) | PSAS | [structure shown] | 731 | 192 |
| poly (sodium acrylate) | PSA | [structure shown] | 864 | 307 |
| poly (potassium vinyl sulphate) | PPVS | [structure shown] | 798 | 266 |

All of the polymers in the table are effective at producing good quality sols. The samples prepared were characterised by the $\lambda_{max}$ and FWHM of the main adsorption band. The quality of the sols was characterised by the reproducibility of the position of the $\lambda_{max}$ and the narrowness (low FWHM) of the band. Using these criteria the polymers from the table, in order of preference, are: PSAS; PSS-co-MA; PSA; PSSS; PPVS; PSVS.

The invention is not limited to the embodiments hereinbefore described, which may be varied in detail.

The invention claimed is:

1. A process for producing nanoparticles comprising the steps of:
   preparing silver seeds by combining aqueous solutions consisting essentially of trisodium citrate, sodium borohydride, and a water soluble polyanionic polymer selected from the group consisting of: a derivative of an inorganic salt of poly(styrene sulphonate); a copolymer of poly(sodium styrene sulphonate-co-maleic acid); a derivative of poly(anethole sulphonate); a derivative of poly(vinyl sulphate); or a derivative of poly(vinyl sulphonate); and subsequently adding aqueous silver nitrate; and
   growing the silver seeds to form nanoparticles, the growing of the silver seeds taking place at room temperature using water as a solvent, greater than about 95% of the nanoparticles thus produced being nanoprisms.

2. The process as claimed in claim 1 wherein the polymer is a derivative of a monovalent salt of poly(styrene sulphonate).

3. The process as claimed in claim 1 wherein the polymer is poly(sodium styrene sulphonate) (PSSS).

4. The process as claimed in claim 3 wherein the PSSS has a molecular weight between about 3 KDa to about 1,000 KDa.

5. The process as claimed in claim 3 wherein the PSSS has a molecular weight of about 1,000 KDa.

6. The process as claimed in claim 1 wherein the polymer is poly(sodium anethole sulphonate).

7. The process as claimed in claim 1 wherein the polymer is poly(potassium vinyl sulphate).

8. The process as claimed in claim 1 wherein the polymer is poly(sodium vinyl sulphonate).

9. The process as claimed in claim 1 wherein the concentration of polymer in the silver seed preparation is between about 0.2 mg/l to about 2 g/l.

10. The process as claimed in claim 1 wherein the concentration of polymer in the silver seed preparation is about 12.5 mg/l.

11. The process as claimed in claim 1 wherein the step of growing the silver seeds involves the silver seed-catalysed reduction of $Ag^+$ by ascorbic acid.

12. A process for producing nanoparticles comprising the steps of:
- preparing silver seeds in the presence of a water soluble polyanionic polymer wherein the polymer is selected from the group consisting of: poly(sodium anethole sulphonate), poly(potassium vinyl sulphate), and poly(sodium vinyl sulphonate); and
- growing the silver seeds to form nanoparticles, the growing of the silver seeds taking place at room temperature using water as a solvent, greater than about 95% of the nanoparticles thus produced being nanoprisms.

* * * * *